US012521990B2

(12) United States Patent
Kitayama

(10) Patent No.: US 12,521,990 B2
(45) Date of Patent: Jan. 13, 2026

(54) INKJET RECORDING APPARATUS

(71) Applicant: KYOCERA Document Solutions Inc., Osaka (JP)

(72) Inventor: Kaori Kitayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 99 days.

(21) Appl. No.: 18/686,676

(22) PCT Filed: Aug. 30, 2022

(86) PCT No.: PCT/JP2022/032510
§ 371 (c)(1),
(2) Date: Feb. 26, 2024

(87) PCT Pub. No.: WO2023/032951
PCT Pub. Date: Mar. 9, 2023

(65) Prior Publication Data

US 2024/0359472 A1 Oct. 31, 2024

(30) Foreign Application Priority Data

Aug. 31, 2021 (JP) ................................ 2021-141439

(51) Int. Cl.
*B41J 2/17* (2006.01)
*B41J 2/155* (2006.01)

(52) U.S. Cl.
CPC ............ *B41J 2/1721* (2013.01); *B41J 2/155* (2013.01)

(58) Field of Classification Search
CPC ....... B41J 2/155; B41J 2/1721; B41J 2/16523
See application file for complete search history.

(56) References Cited

U.S. PATENT DOCUMENTS

2003/0156172 A1* 8/2003 Matsuba ................ B41J 29/026 347/86
2004/0075712 A1* 4/2004 Ono ....................... B41J 2/1721 347/36

(Continued)

FOREIGN PATENT DOCUMENTS

CN 108973338 A 12/2018
JP H 07-186401 A 7/1995

(Continued)

OTHER PUBLICATIONS

Extended European Search Report mailed Jul. 14, 2025, issued to European Application No. 22864533.9.

(Continued)

*Primary Examiner* — Scott A Richmond
(74) *Attorney, Agent, or Firm* — Stein IP, LLC

(57) ABSTRACT

The inkjet recording apparatus includes a plurality of line heads each including a recording head, a plurality of waste ink collection containers, a display portion that indicates states of the line heads and the waste ink collection containers, and a control portion that detects the states of the line heads and the waste ink collection containers and controls display portion. In a case where an unused line head or an unused waste ink collection container exists and where a recording head in one of the line heads in use or one of the waste ink collection containers in use needs to be replaced, the control portion indicates, on the display portion, the recording head in the unused line head or the unused waste ink collection container as a recording head available for replacement or a waste ink collection container available for replacement.

7 Claims, 11 Drawing Sheets

(56) References Cited

U.S. PATENT DOCUMENTS

| | | | | |
|---|---|---|---|---|
| 2004/0207668 | A1* | 10/2004 | Adkins | B41J 2/17566 347/7 |
| 2005/0063753 | A1* | 3/2005 | Morita | B41J 2/155 400/175 |
| 2006/0244799 | A1 | 11/2006 | Sasa et al. | 347/89 |
| 2010/0318582 | A1* | 12/2010 | Nimura | G06Q 10/06 707/805 |
| 2018/0345672 | A1 | 12/2018 | Ueno | B41J 2/1721 |

FOREIGN PATENT DOCUMENTS

| | | | |
|---|---|---|---|
| JP | H 08-020113 | A | 1/1996 |
| JP | 2004-276387 | A | 10/2004 |
| JP | 2011-016255 | A | 1/2011 |

OTHER PUBLICATIONS

Chinese Office Action mailed Nov. 15, 2025, issued to Chinese Patent Application No. 202280058034.9.

* cited by examiner

INKJET RECORDING APPARATUS

CROSS-REFERENCE TO RELATED APPLICATIONS

This application is a national stage of International Application No. PCT/JP2022/032510, filed Aug. 30, 2022, which claims the benefit of Japanese Application No. 2021-141439, filed Aug. 31, 2021, in the Japanese Patent Office, the disclosures of which are incorporated herein by reference.

TECHNICAL FIELD

The present disclosure relates to an inkjet recording apparatus.

BACKGROUND ART

Inkjet recording apparatuses that record an image by ejecting ink from nozzles provided in recording heads are capable of forming a high-definition image and thus have been widely used as recording apparatuses such as facsimile machines, copiers, and printers.

In such an inkjet recording apparatus, in a case where the maximum number of colors available for use is larger than the number of colors actually used, some recording heads and some waste ink collection containers may be left without being used. In such a case, if an unused recording head or an unused waste ink collection container is left without being used, it is a waste of the component itself and its installation space as well.

Patent Document 1 listed below discloses an image recording apparatus that includes a cartridge holding portion that is disposed in a recording head to hold an ink cartridge used in printing, and a waste ink-cartridge storage portion for storing a waste ink tank. In this image recording apparatus, an empty ink cartridge is used as a waste ink tank to store therein waste ink received from a capping member via a waste ink outlet, and when a next empty ink cartridge is discharged from the cartridge holding portion, the waste ink tank is replaced.

As a maintenance method for an unused component, an inkjet recording apparatus disclosed in Patent Document 2 listed below selectively electrifies an unused cartridge stored in a storage portion and an in-use ink cartridge mounted on a carrier, and, besides electrification for printing, periodically electrifies the unused cartridge stored in the storage portion to thereby perform dummy ejection that does not contribute to printing.

CITATION LIST

Patent Literature

Patent Document 1: Japanese Patent Application Publication No. H07-186401

Patent Document 2: Japanese Patent Application Publication No. H08-20113

SUMMARY OF INVENTION

Technical Problem

With the methods disclosed in Patent Documents 1 and 2, it is possible to facilitate replacement and reuse of a used ink cartridge and a maintenance operation for an unused ink cartridge, but unfortunately, it is impossible to make an effective use of an unused recording head or an unused waste ink collection container and the installation space thereof.

In view of the above problem, an object of the present invention is to provide an inkjet recording apparatus capable of making effective use of an unused recording head and an unused waste ink collection container.

Solution to Problem

To achieve the above object, according to a first configuration of the present invention, an inkjet recording apparatus includes a conveyance portion, a plurality of line heads, a plurality of waste ink collection containers, a display portion, and a control portion. The conveyance portion conveys a sheet. The plurality of line heads each include a recording head that performs image recording by ejecting ink onto the sheet that is conveyed by the conveyance portion. The plurality of waste ink collection containers each collect and store the ink of a corresponding one of different colors that has been ejected from the recording head but has not been used in the image recording. The display portion indicates states of the line heads and the waste ink collection containers. The control portion detects the states of the line heads and the waste ink collection containers and controls display performed by the display portion. Here, in a case where an unused line head exists among the line heads or an unused waste ink collection container exists among the waste ink collection containers and where the recording head in one of the line heads in use or one of the waste ink collection containers in use needs to be replaced, the control portion indicates, on the display portion, the recording head in the unused line head or the unused waste ink collection container as a recording head available for replacement or a waste ink collection container available for replacement.

Advantageous Effects of Invention

According to the first configuration of the present invention, in a case where a recording head in use or a waste ink collection container in use needs to be replaced, it is notified that it can be replaced with an unused recording head or an unused waste ink collection container. Thus, even in a case where no replacement recording head or no replacement waste ink collection container is available at hand, it is possible to continue using the inkjet recording apparatus, and thus to suppress occurrence of down time of the inkjet recording apparatus. Further, the unused recording head and the unused waste ink collection container are made use of without being left unused, and this contributes to effective use of components.

DESCRIPTION OF EMBODIMENTS

Figure 1:
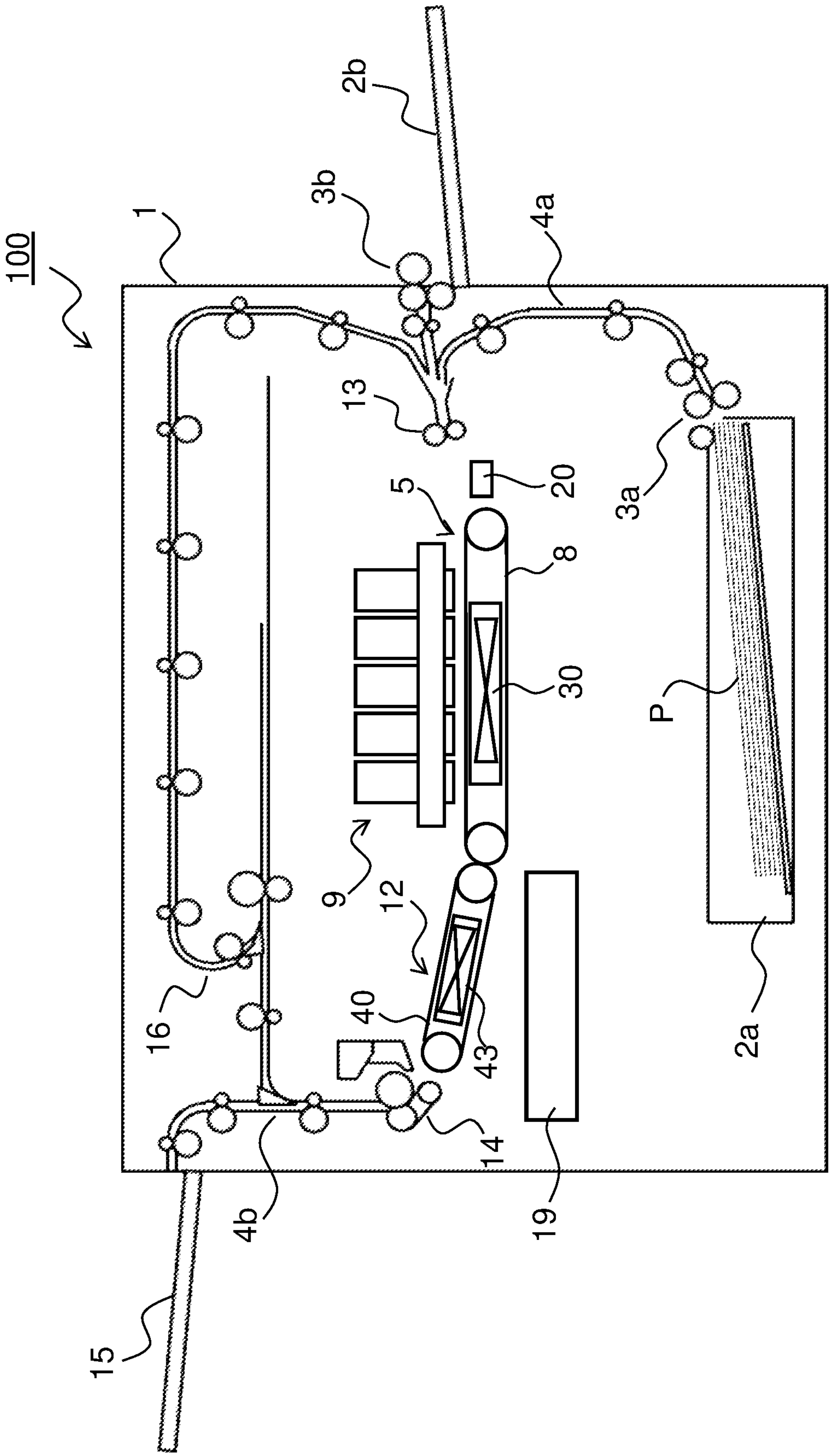
FIG. 1 is a side sectional view showing an outline of a structure of a printer 100 according to an embodiment of the present invention.
Figure 2:
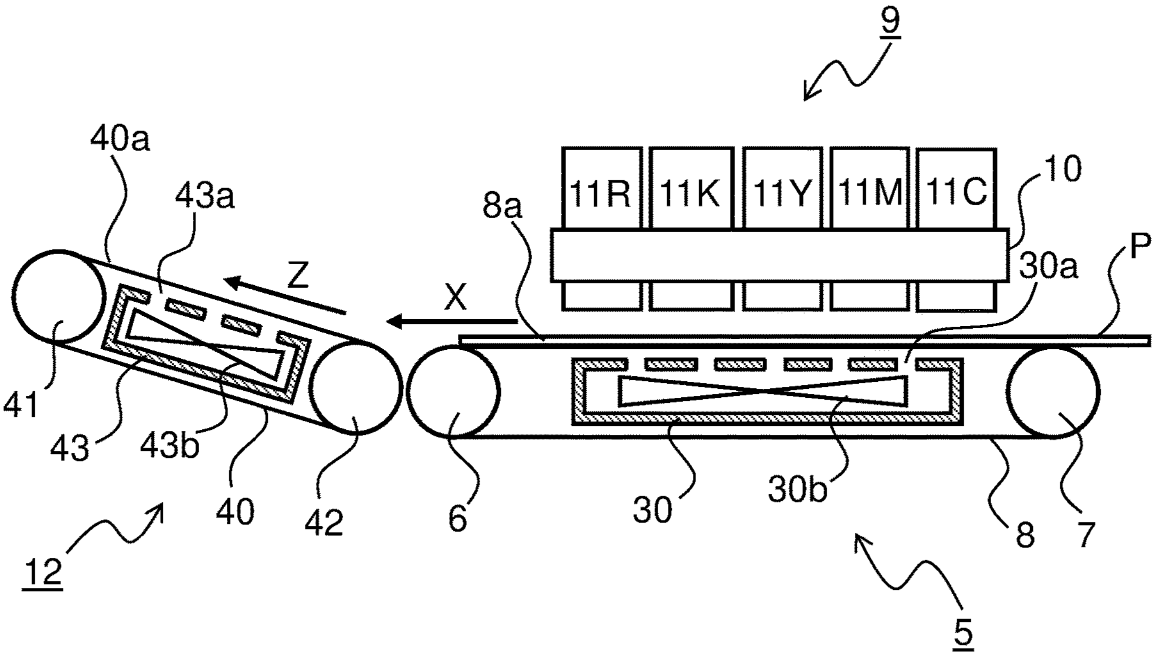
FIG. 2 is a side sectional view showing a structure of and around a first belt conveyance portion 5, a recording portion 9, and a second belt conveyance portion 12 of the printer 100 according to the present embodiment.
Figure 3:
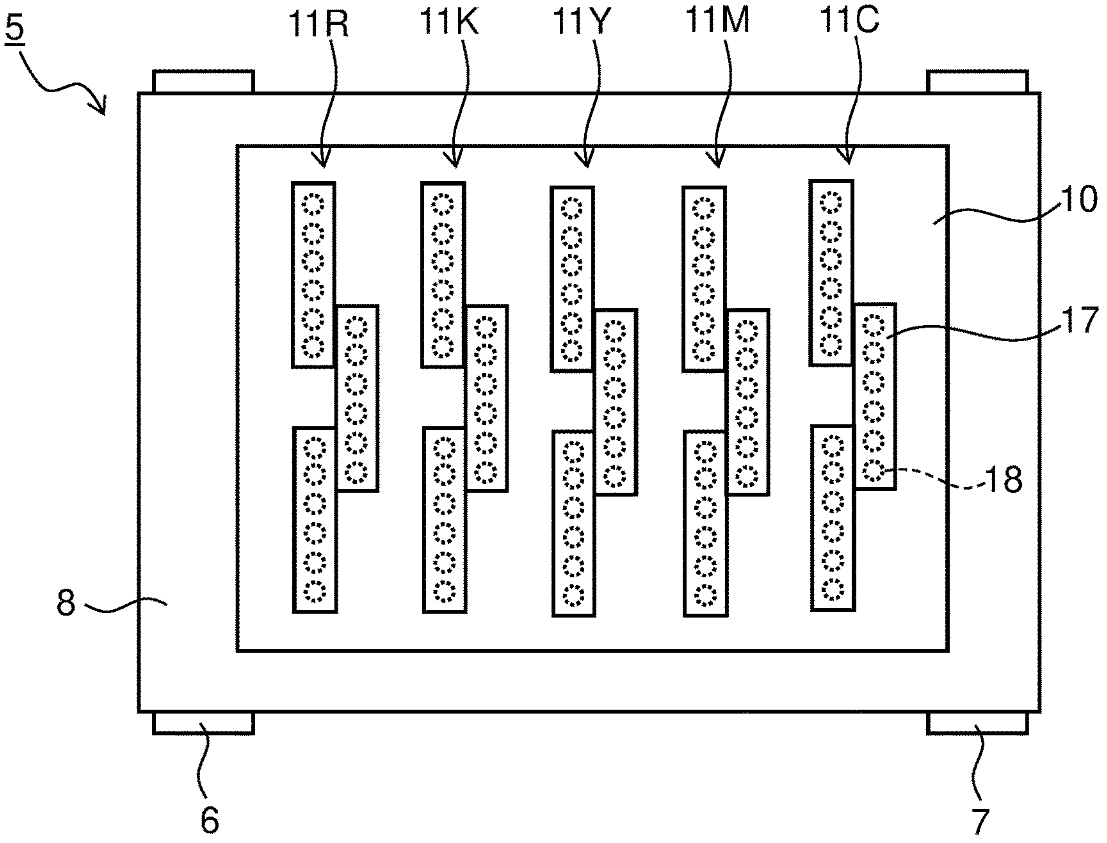
FIG. 3 is a plan view, as seen from above, of the first belt conveyance portion 5 and the recording portion 9 of the printer 100 according to the present embodiment.

Hereinafter, embodiments of the present invention will be described with reference to the accompanying drawings. FIG. 1 is a diagram showing an outline of a structure of a printer 100 according to an embodiment of the present invention. FIG. 2 is a side sectional view showing a structure of and around a first belt conveyance portion 5, a recording portion 9, and a second belt conveyance portion 12 of the printer 100 according to the present embodiment. FIG. 3 is a plan view, as seen from above, of the first belt conveyance portion 5 and the recording portion 9 of the printer 100 according to the present embodiment.

As shown in a FIG. 1, in the printer 100, in a lower part inside a printer main body 1 thereof, there is arranged a sheet feeding cassette 2*a* which is a sheet storage portion. At an outer right side face of the printer main body 1, a manual sheet feeding tray 2*b* is provided. Downstream of the sheet feeding cassette 2*a* in a sheet conveyance direction (that is, to the upper right of the sheet feeding cassette 2*a* in FIG. 1), a sheet feeding device 3*a* is disposed. Downstream of the manual sheet feeding tray 2*b* in the sheet conveyance direction (that is, to the left of the manual sheet feeding tray 2*b* in FIG. 1), a sheet feeding device 3*b* is disposed. These sheet feeding devices 3*a* and 3*b* each send out sheets P separately one by one.

Inside the printer 100, a first sheet conveyance path 4*a* is provided. The first sheet conveyance path 4*a* is located at a position that is to the upper right of the sheet feeding cassette 2*a* and that is to the left of the manual sheet feeding tray 2*b*. A sheet P sent out from the sheet feeding cassette 2*a* passes through the first sheet conveyance path 4*a* to be conveyed vertically upward along a side face of the printer main body 1. A sheet P sent out from the manual sheet feeding tray 2*b* passes through the first sheet conveyance path 4*a* to be conveyed substantially horizontally leftward.

At a downstream end of the first sheet conveyance path 4*a* with respect to the sheet conveyance direction, a pair of registration rollers 13 are provided. Closely downstream of the pair of registration rollers 13, the first belt conveyance portion (conveyance portion) 5 and the recording portion 9 are disposed. The pair of registration rollers 13, while correcting skewed feeding of a sheet P, send out the sheet P toward the first belt conveyance portion 5 with timing coordinated with timing of ink ejection operation executed by the recording portion 9.

Between the pair of registration rollers 13 and the first belt conveyance portion 5, there is disposed a contact image sensor (CIS) 20 for detecting a position of an end part of a sheet P in a width direction (a direction perpendicular to the sheet conveyance direction) thereof.

The first belt conveyance portion 5 is provided with a first conveyance belt 8 that is an endless belt wound around a first driving roller 6 and a first driven roller 7. A sheet P sent out from the pair of registration rollers 13 passes under the recording portion 9 in a state held by suction on a conveyance surface 8*a* (an upper surface in FIG. 1) of the first conveyance belt 8.

At a position that is inside the first conveyance belt 8 and that is opposite a back side of the conveyance surface 8*a* of the first conveyance belt 8, a first sheet suction portion 30 is provided. The first sheet suction portion 30 is provided with a large number of holes 30*a* for air suction formed in an upper face thereof. The first sheet suction portion 30 has a fan 30*b* disposed inside thereof, and is capable of sucking air downward through the upper face thereof. Further, the first conveyance belt 8 is also provided with a large number of vent holes (not shown) for air suction. This configuration allows the first belt conveyance portion 5 to convey a sheet P while holding it by suction on the conveyance surface 8*a* of the first conveyance belt 8.

The recording portion 9 performs recording of an image on a sheet P conveyed thereto by being held by suction on the conveyance surface 8*a* of the first conveyance belt 8. As shown in FIGS. 2 and 3, the recording portion 9 includes a head housing 10, and five line heads 11C, 11M, 11Y, 11K, and 11R which are supported in the head housing 10. The line heads 11C to 11R each have a recording region with a width equal to or larger than a width of the sheet P conveyed, and are supported at such a height that a predetermined interval (1 mm, for example) is left from the conveyance surface 8*a* of the first conveyance belt 8. In each of the line heads 11C to 11R, three recording heads 17 are arranged in a staggered array along a sheet width direction (an up-down direction in FIG. 3), which is perpendicular to the sheet conveyance direction. In each of the recording heads 17, on an ink ejection surface thereof, a large number of ink ejection nozzles 18 are arranged. The recording heads 17 disposed in the line heads 11C to 11R are all identical in shape and configuration, and thus are interchangeable with each other.

The recording heads 17 constituting the line heads 11C to 11K are supplied with ink of four colors (cyan, magenta, yellow, and black) stored in ink containers 50C to 50K (see FIG. 5) corresponding to the colors of the line heads 11C to 11K.

Corresponding to information of image data received from an external computer or the like, the line heads 11C to 11K each sequentially eject ink of cyan, magenta, yellow, or black from ink ejection nozzles 18 of their respective recording heads 17 toward a sheet P attached by suction on the first conveyance belt 8. As a result, on the sheet P, a full-color image having ink of the four colors, namely, cyan, magenta, yellow, and black superimposed one on another is formed. Note that the line head 11R is not used.

On a downstream side (a left side in FIG. 1) of the first belt conveyance portion 5 with respect to the sheet conveyance direction, the second belt conveyance portion 12 is disposed. The sheet P having an image recorded thereon at the recording portion 9 is sent to the second belt conveyance portion 12, and the ink which has been ejected onto a surface of the sheet P is dried while the sheet P is passing over the second belt conveyance portion 12.

The second belt conveyance portion 12 includes a second conveyance belt 40 that is an endless belt wound around a second driving roller 41 and a second driven roller 42. The second conveyance belt 40 is caused by the second driving roller 41 to rotate counterclockwise in FIG. 2. The sheet P having an image recorded thereon by the recording unit 9 and conveyed by the first belt conveyance portion 5 in an arrow-X direction is transferred to the second conveyance belt 40 to be conveyed in an arrow-Z direction in FIG. 2.

At a position that is inside the second conveyance belt 40 and that is opposite a back side of a conveyance surface 40*a* of the second conveyance belt 40, a second sheet suction portion 43 is provided. The second sheet suction portion 43 is provided with a large number of holes 43*a* for air suction formed in an upper face thereof. The second sheet suction portion 43 is provided with a fan 43*b* disposed inside thereof, and is capable of sucking air downward through the upper face thereof. The second conveyance belt 40 also has a large number of vent holes (not shown) for air suction formed therein. This configuration allows the second belt conveyance portion 12 to convey a sheet P while holding the sheet P by suction on the conveyance surface 40*a* of the second conveyance belt 40.

At a position that is on a downstream side of the second belt conveyance portion 12 with respect to the sheet conveying direction and that is close to a left side face of the printer main body 1, a decurler portion 14 is provided. The sheet P having the ink thereon dried on the second belt conveyance portion 12 is sent to the decurler portion 14, where a curl developed in the sheet P is corrected.

Downstream of (in FIG. 1, above) the decurler portion 14 with respect to the sheet conveying direction, a second sheet conveyance path 4*b* is provided. In a case where double-sided recording is not to be performed, after passing through the decurler portion 14, the sheet P is conveyed through the second sheet conveyance path 4*b*, via a pair of discharge rollers, onto a sheet discharge tray 15 provided on an outer left side face of the printer 100. In a case where double-sided recording is to be performed, the sheet P on one side of which recording has been completed passes through the second belt conveyance portion 12 and the decurler portion 14, and then passes through the second sheet conveyance path 4*b* to be conveyed into a reverse conveyance path 16. In the reverse conveyance path 16, the sheet conveying direction is switched to turn the sheet P upside down, and then the sheet P passes through an upper part of the printer 100 to be conveyed to the pair of registration rollers 13. Thereafter, the sheet P is conveyed, with its unrecorded surface facing up, back to the first belt conveyance portion 5.

Under the second belt conveyance portion 12, a maintenance unit 19 is arranged. When executing maintenance of the recording heads 17, the maintenance unit 19 moves to under the recording portion 9, and wipes off the ink ejected (purged) from the ink ejection nozzles 18 of the recording heads 17.

Figure 4:
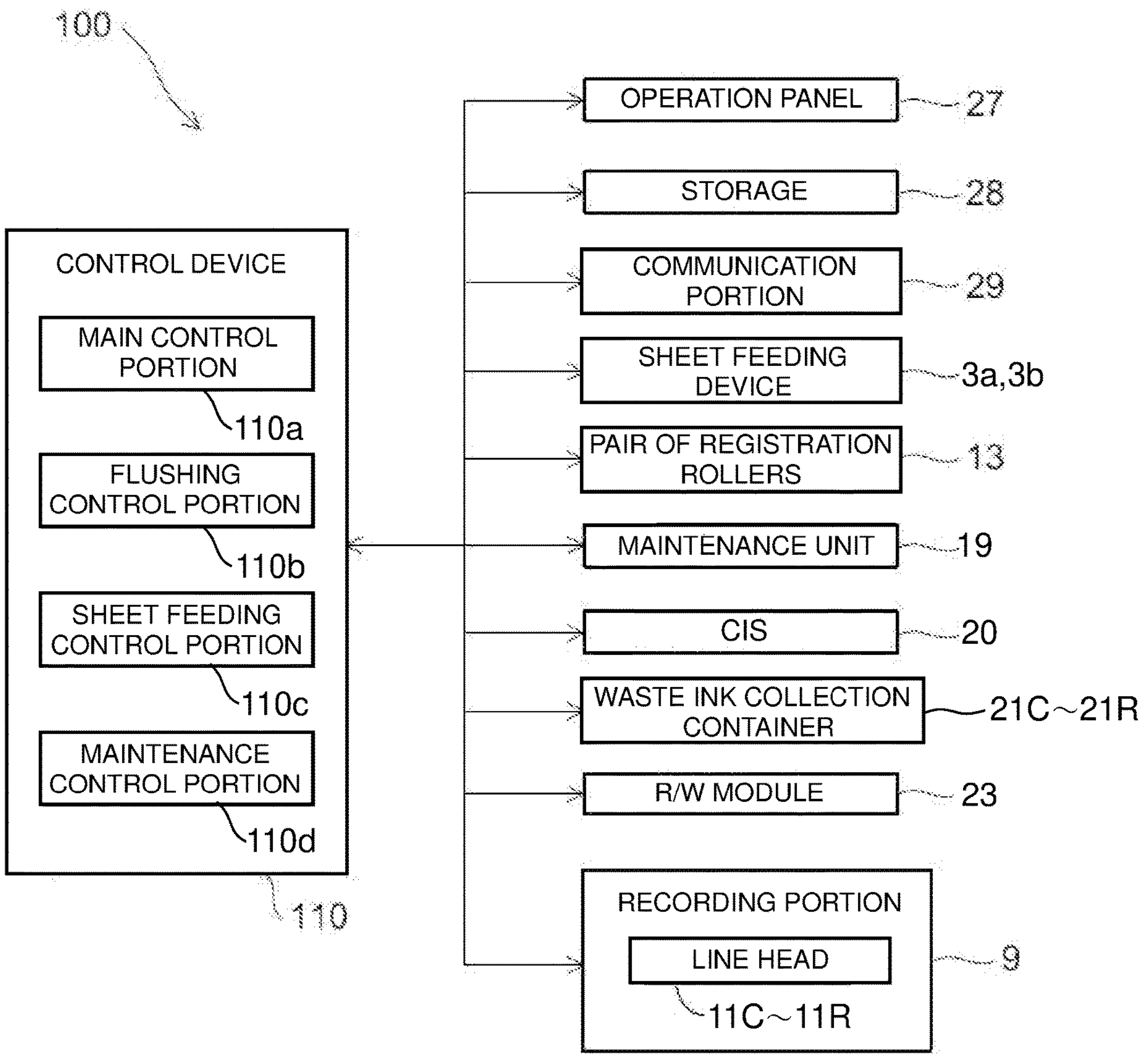
FIG. 4 is a block diagram showing an example of a control path of the printer 100 according to the present embodiment.

FIG. 4 is a block diagram showing an example of a control path of the printer 100 of the present embodiment. In addition to the above-described configurations, the printer 100 further includes waste ink collection containers 21C to 21R, a reader/writer module 23, an operation panel 27, a storage 28, and a communication portion 29.

The waste ink collection containers 21C to 21R are respectively provided corresponding to the line heads 11C to 11R. The waste ink collection containers 21C to 21R respectively collect ink that has been ejected from the recording heads 17 constituting the line heads 11C to 11R but has not been used in image recording (printing), and store the collected ink therein. Examples of ink that has not been used in image recording include ink ejected in idle ejection (flushing) which is performed for the purpose of preventing clogging of the ink ejection nozzles 18 at times other than when image recording is performed, and ink (purge ink) pushed out of the ink ejection nozzles 18 in a recovery operation of the recording heads 17 after a long period of disuse.

The reader/writer module 23 reads and writes information from and onto IC chips 53 (see FIG. 5) mounted on the recording heads 17. In the present invention, radio frequency identification (RFID), in which reading and updating of information regarding ink color and ink installation stored in the IC chips 53 is performed by the reader/writer module 23, is used to determine whether the recording heads 17 are unused or not.

The operation panel 27 is an operation portion for accepting inputs of various settings. For example, by operating the operation panel 27, an operator can input the size of a sheet P to be set in the sheet feeding cassette 2*a*, that is, the size of a sheet P to be conveyed by the first conveyance belt 8. Further, by operating the operation panel 27, the operator can also input the number of sheets P to be printed and give an instruction to start a print job. The operation panel 27 further functions as a notification device (a display portion) that gives notifications regarding the operation status of the printer 100 and, as will be described later, notifications regarding the line heads 11C to 11R and the waste ink collection containers 21C to 21R.

The storage 28 is a memory that stores an operation program for a control device 110 and various kinds of information, and is configured by including a read only memory (ROM), a random access memory (RAM), a non-volatile memory, etc. Information set via the operation panel 27 is stored in the storage 28.

The communication portion 29 is a communication interface for transmitting and receiving information to and from an external device (such as a personal computer (PC)). For example, when the operator operates a PC to transmit a printing command together with image data to the printer 100, the image data and the printing command is fed to the printer 100 via the communication portion 29. In the printer 100, a main control portion 110*a* controls the recording heads 17 of each of the line heads 11C to 11K based on the image data mentioned above and causes the recording heads 17 to eject ink, whereby an image can be recorded on a sheet P.

The printer 100 of the present embodiment includes the control device 110. The control device 110 is configured by including, for example, a central processing unit (CPU) and a memory. Specifically, the control device 110 includes the main control portion 110*a*, a flushing control portion 110*b*, a sheet feeding control portion 110*c*, and a maintenance control portion 110*d*.

The main control portion 110*a* controls operations of various portions of the printer 100. For example, operations such as driving of various rollers provided inside the printer 100, ejection of ink from the recording heads 17 during image recording, and the like are controlled by the main control portion 110*a*. The flushing control portion 110*b* drives the ink ejection nozzles 18 of the recording heads 17 to execute flushing. For flushing, openings (not shown) are formed in the first conveyance belt 8, and during flushing, ink is ejected from the ink ejection nozzles 18 with timing coordinated with timing of passing of the openings.

The sheet feeding control portion 110*c* is a recording medium feeding control portion that controls the pair of registration rollers 13 functioning as a recording medium feeding portion. For example, the sheet feeding control portion 110*c* controls the pair of registration rollers 13 based on timing when the CIS 20 detects a rear end of a sheet P, and thereby controls timing of conveying a next sheet P.

The maintenance control portion 110*d* performs control for causing the recording heads 17 to execute the above-described purging of forcibly pushing the ink out of each of the ink ejection nozzles 18. When causing the recording heads 17 to execute the purging, the maintenance control portion 110*d* also controls driving of the above-described maintenance unit 19 (for example, movement of the maintenance unit 19 downward of the recording portion 9 and evacuation of the maintenance unit 19 from downward of the recording portion 9).

The control device 110 may further include a calculation portion that performs necessary calculations and a timer that counts time. Or instead, the functions of the calculation portion and the timer may be executed by the main control portion 110*a*.

Figure 5:
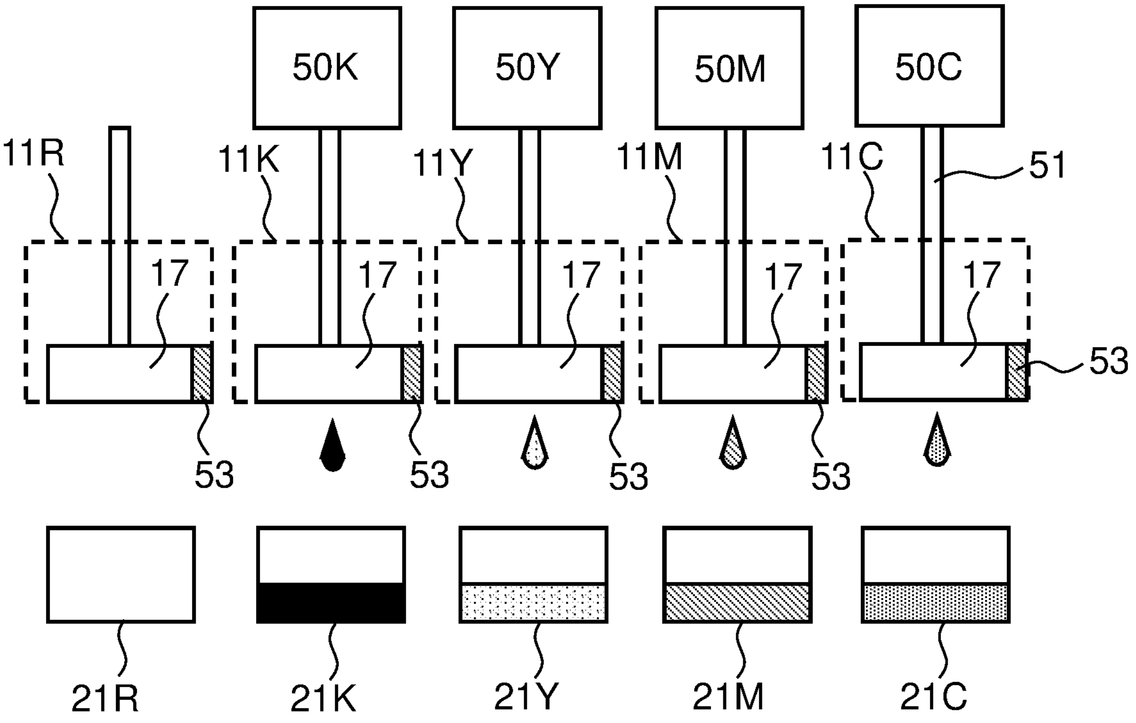
FIG. 5 is a diagram schematically showing an ink moving path via line heads 11C to 11R in the printer 100 according to the present embodiment.

FIG. 5 is a diagram schematically showing an ink moving path via the line heads 11C to 11R in the printer 100 of the present embodiment. As shown in FIG. 5, to the ink containers 50C to 50K, the line heads 11C to 11K are connected via ink supply paths 51. The ink containers 50C to 50K are each filled with ink of cyan, magenta, yellow, or black, and supply the ink via the ink supply paths 51 to the recording heads 17 in the line heads 11C to 11K. The ink containers 50C to 50K are attachable and detachable with respect to the printer main body 1, and when the ink containers 50C to 50K become empty with the ink therein used up, they are replaced with new ink containers 50C to 50K.

To the recording heads 17, the IC chips 53 are attached. Onto the IC chips 53 attached to the recording heads 17 in the line heads 11C to 11K, at a time when the printer 100 starts to be used, the reader/writer module 23 (see FIG. 4) writes information regarding ink color and ink installation.

Corresponding to the line heads 11C to 11R, the waste ink collection containers 21C to 21R are provided. Ink (waste ink) that has not been used in image recording, such as ink ejected in flushing and ink purged, is collected in the waste ink collection containers 21C to 21R via ink receiving portions and ink collection paths (of which none is illustrated) disposed opposite the recording heads 17. The waste ink collection containers 21C to 21R are all identical in shape and structure, and thus are interchangeable with each other.

Here, the line head 11R is provided as a reserve. In a case of using ink of another color in addition to cyan, magenta, yellow, and black, an ink container of the predetermined color is connected to the line head 11R. In the present embodiment, the line head 11R is unused, and thus no ink container is connected thereto, and the recording heads 17 thereof is in an unused state. Thus, no information regarding either ink color or ink installation has been written on the IC chips 53 attached to the recording heads 17 in the line head 11R. The waste ink collection container 21R is also in an unused (empty) state.

In a case, for example, where one of the recording heads 17 in the line heads 11C to 11K which are in use has failed or where one of the waste ink collection containers 21C to 21K has become full, the failed recording head 17 or the full one of the waste ink collection containers 21C to 21K needs to be replaced, but there may be a case where unfortunately no recording head or no waste ink collection container for replacement is available at hand. In such a case, if it can be indicated that the recording head 17 of the line head 11R or the waste ink collection container 21R is available for replacement, it is possible to continue using the printer 100. The recording head 17 of the line head 11R and the waste ink collection container 21R, which are unused, can be made effective use of, without being left unused in the printer main body 1.

Figure 6:
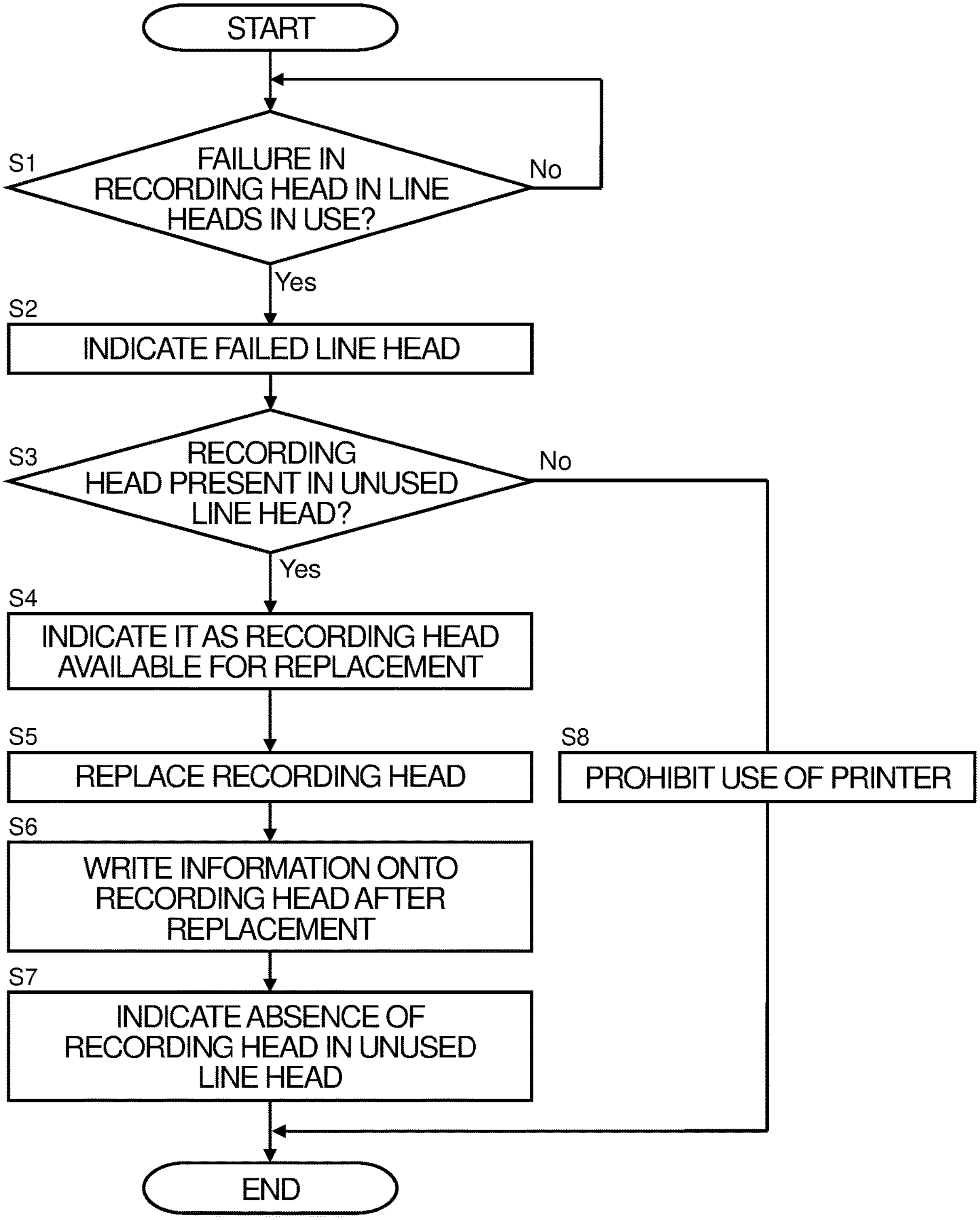
FIG. 6 is a flow chart showing an example of a procedure of replacing a recording head 17 executed in the printer 100 according to the present embodiment.

FIG. 6 is a flow chart showing an example of a procedure of replacing the recording heads 17 executed in the printer 100 according to the present embodiment. Referring to FIGS. 1 to 5 and later-described FIGS. 7 and 8 as necessary, and following the steps shown in FIG. 6, a description will be given of the procedure of replacing the recording heads 17 in the printer 100.

The main control portion 110*a* determines whether or not failure has occurred in the recording heads 17 of the line heads 11C to 11K in use (step S1). In a case where no failure has occurred (No in step S1), the monitoring of failure is continued. In a case where a recording head 17 of one of the line heads 11C to 11K has failed, (Yes in step S1), the main control portion 110*a* indicates, on the operation panel 27, the one (for example, the line head 11K) of the line heads 11C to 11K in which the failure has occurred (step S2).

Next, the main control portion 110*a* determines presence/absence of a recording head 17 in the line head 11R that is unused (step S3). The presence/absence of a recording head 17 and whether the recording head 17 is unused or not can be determined by the reader/writer module 23 reading color information stored in the IC chip 53 on the recording head 17 of the line head 11R.

In a case where there is a recording head 17 in the line head 11R that is unused (Yes in step S3), the main control portion 110*a* indicates, on the operation panel 27, the recording head 17 of the line head 11R as a recording head 17 available for replacement (step S4).

Figure 7:
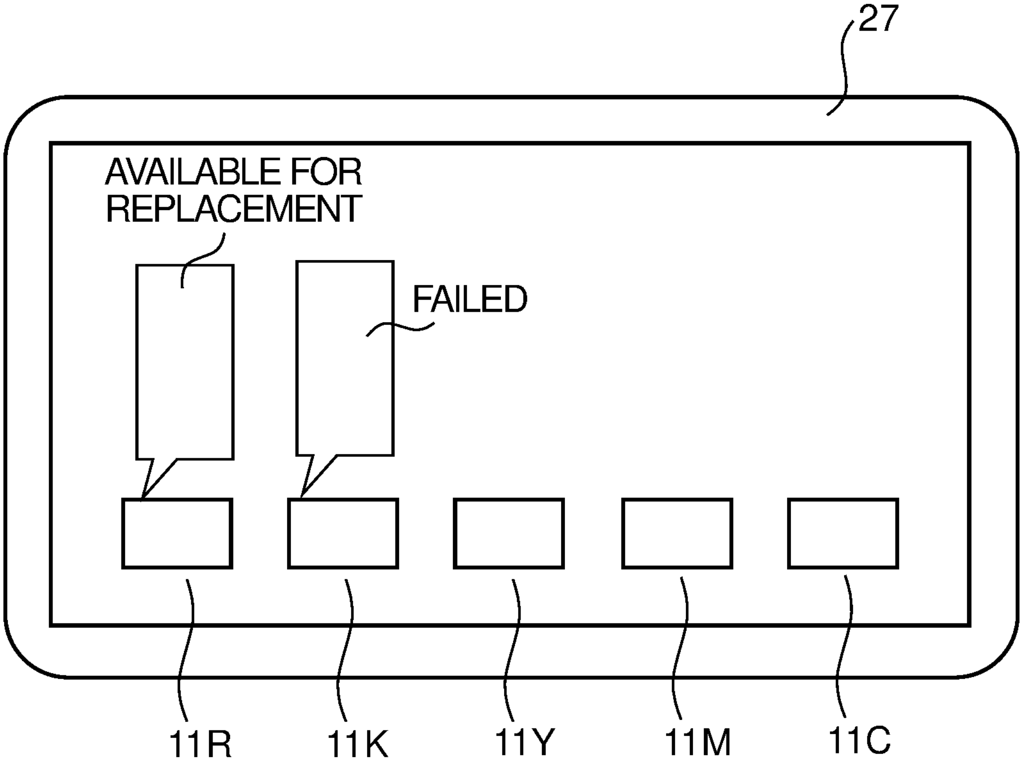
FIG. 7 is a conceptual diagram of an operation panel 27 indicating that a recording head 17 of the line head 11R is available for replacement.

FIG. 7 is a conceptual diagram of the operation panel 27 indicating that the recording head 17 of the line head 11R is available for replacement. For example, in a case where a recording head 17 of the line head 11K for black has failed, it is indicated that a failure has occurred in the line head 11K, as well as that the recording head 17 of the line head 11R that is unused is available for replacement. The operator confirms what is indicated on the operation panel 27, and then removes the failed recording head 17 of the line head 11K to replace it with the recording head 17 of the line head 11R (step S5).

Figure 8:
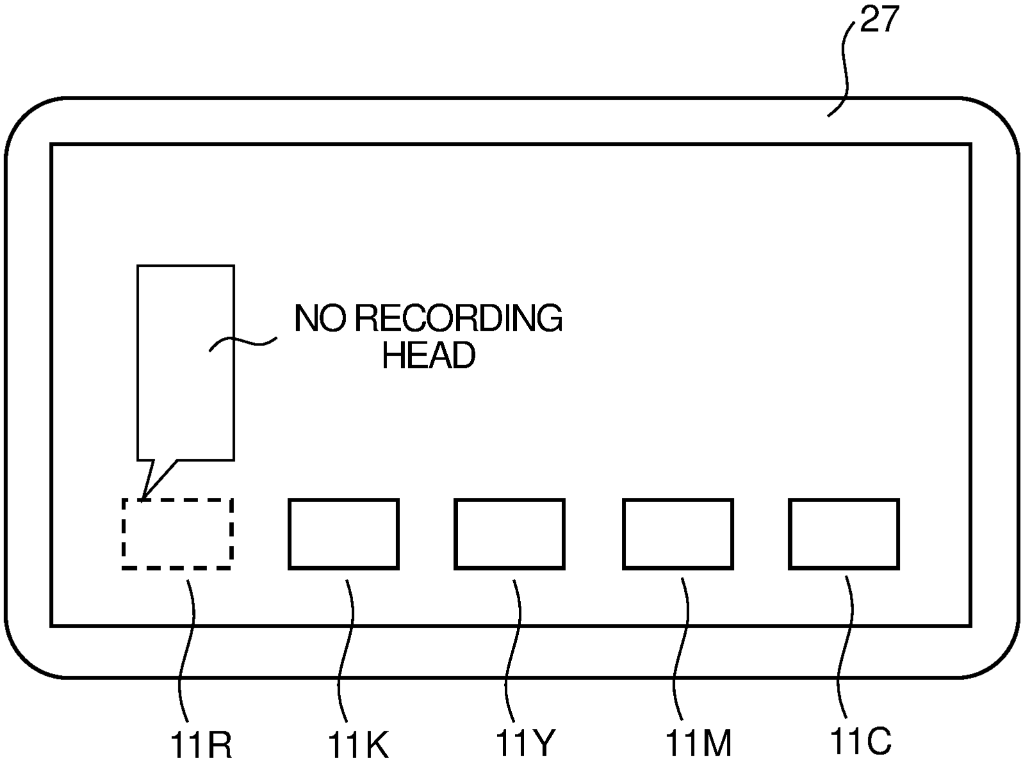
FIG. 8 is a conceptual diagram of the operation panel 27 indicating that the recording head 17 of the line head 11R has been used.

Next, the main control portion 110*a*, by means of the reader/writer module 23, writes color information and ink installation information (here, installation information of the black ink) on the IC chip 53 of the recording head 17 after the replacement (step S6). Thereafter, it is indicated, on the operation panel 27, that there is no recording head 17 present in the line head 11R that is unused (step S7), and the operation of replacing the recording head 17 is finished. FIG. 8 is a conceptual diagram of the operation panel 27 indicating that the recording head 17 of the line head 11R has been used.

On the other hand, in step S3, in a case where there is no recording head 17 present in the line head 11R (No in step S3), use of the printer 100 is prohibited (step S8), and the process is finished.

According to the example of control shown in FIG. 6, in a case where one of the recording heads 17 of the line heads 11C to 11K in use has failed, it is notified to the operator that the recording head 17 of the line head 11R that is unused is available for replacement. Thus, even in a case where no recording head 17 for replacement is available at hand, it is possible to continue using the printer 100, and thus to suppress occurrence of downtime of the printer 100. Further, the recording head 17 of the line head 11R that is unused is made use of without being left unused, and this contributes to effective use of components.

Furthermore, after the recording head 17 of the line head 11R that is unused is used as a replacement recording head 17, it is indicated that there is no recording head 17 present in the line head 11R, and thus the operator can restock the line head 11R with new recording heads 17 in preparation for a next failure in the line head 11C, 11M, 11Y, or 11K, or in preparation for a case where the line head 11R needs to be used.

Note that, even if no recording head 17 is attached in the line head 11R, it will have no effect on operations of the printer 100, and thus it can be freely selected as necessary whether or not to indicate that there is no recording head 17 present in the line head 11R. Further, in a case where a plurality of recording heads 17 available for replacement are attached in the line head 11R, it can be indicated, on the operation panel 27, that the number of recording heads 17 attached in the line head 11R has been reduced as a result of the replacement.

Figure 9:
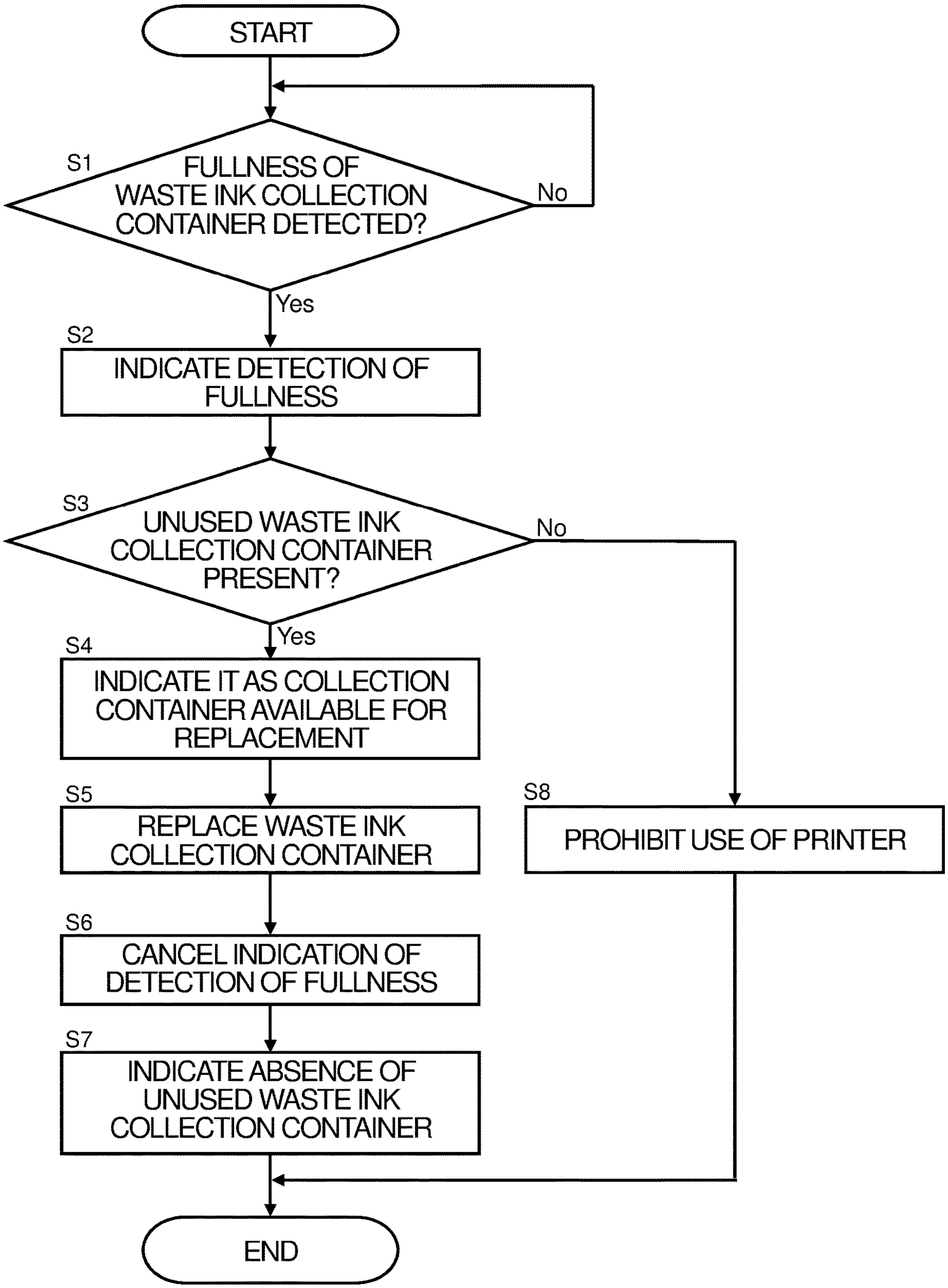
FIG. 9 is a flow chart showing an example of a procedure of replacing waste ink collection containers 21C to 21R executed in the printer 100 according to the present embodiment.

Next, a description will be given of how to make use of the waste ink collection container 21R that is unused. FIG. 9 is a flow chart showing an example of a procedure of replacing the waste ink collection containers 21C to 21R executed in the printer 100 according to the present embodiment. Referring to FIGS. 1 to 5 and later-described FIGS. 10 to 13 as necessary, and following the steps shown in FIG. 9, a description will be given of the procedure of replacing the waste ink collection containers 21C to 21R in the printer 100.

The main control portion 110*a* determines whether or not fullness of the waste ink collection containers 21C to 21K in use has been detected (step S1). Examples of a method for detecting the fullness of the waste ink collection containers 21C to 21K include conventionally known methods such as a method where a sensor, for example, is used to directly detect amounts of ink in the waste ink collection containers 21C to 21K, and a method where the amounts of ink are calculated from amounts of ink ejected (numbers of times of ink ejection) from the recording heads 17 of the line heads 11C to 11K except during image recording.

In a case where none of the waste ink collection containers 21C to 21K has been detected to be full (No in step S1), monitoring for the detection of fullness is continued. In a case where fullness of one of the waste ink collection containers 21C to 21K has been detected (Yes in step S1), the main control portion 110*a* indicates, on the operation panel 27, the one of the waste ink collection containers 21C to 21K (for example, the waste ink collection container 21K) that has been detected to be full (step S2).

Next, the main control portion 110*a* determines presence/absence of the waste ink collection container 21R that is unused (step S3). The presence/absence of the waste ink collection container 21R can be detected, for example, by using a sensor (unillustrated) provided in the attachment portion 55 (see FIG. 11) where the waste ink collection container 21R is attached.

In a case where the waste ink collection container 21R that is unused is present (Yes in step S3), the main control portion 110*a* indicates, on the operation panel 27, the waste ink collection container 21R as a waste ink collection container available for replacement (step S4).

Figure 10:
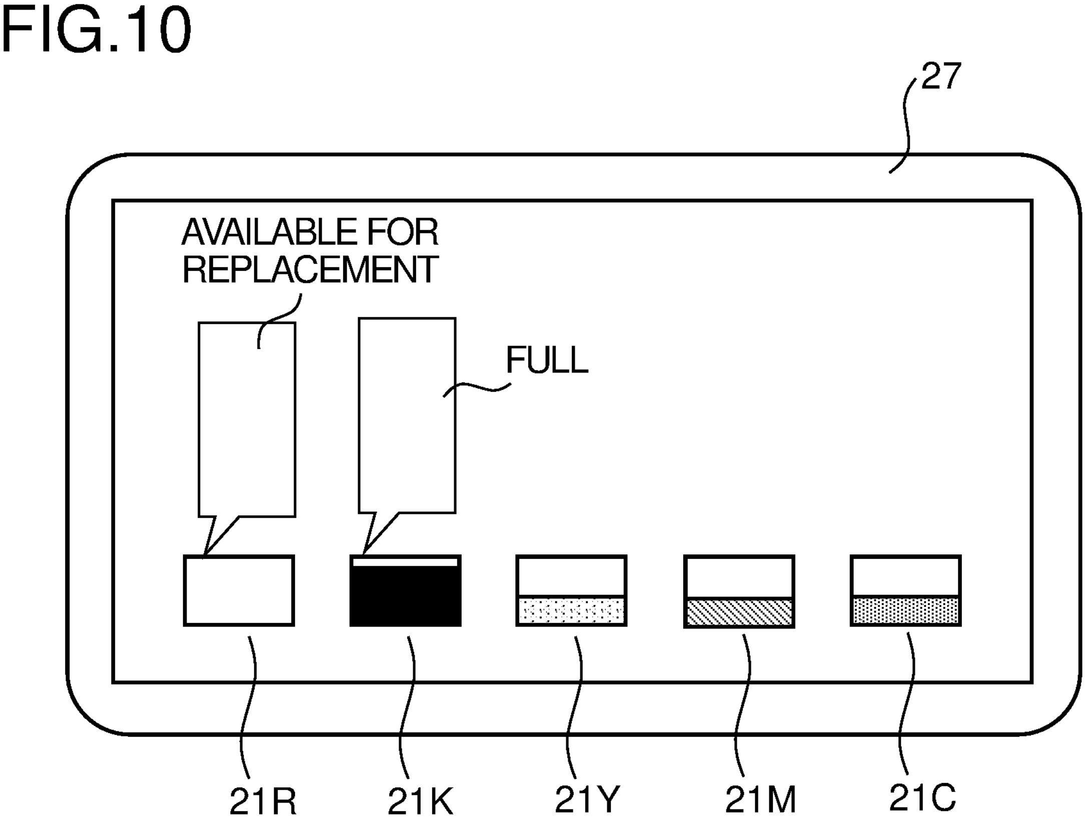
FIG. 10 is a conceptual diagram of the operation panel 27 indicating that the waste ink collection container 21R is available for replacement.

FIG. 10 is a conceptual diagram of the operation panel 27 indicating that the waste ink collection container 21R is available for replacement. For example, in a case where it has been detected that the waste ink collection container 21K for black is full, it is indicated that the waste ink collection container 21K is full and that the waste ink collection container 21R that is unused is available for replacement.

Figure 11:
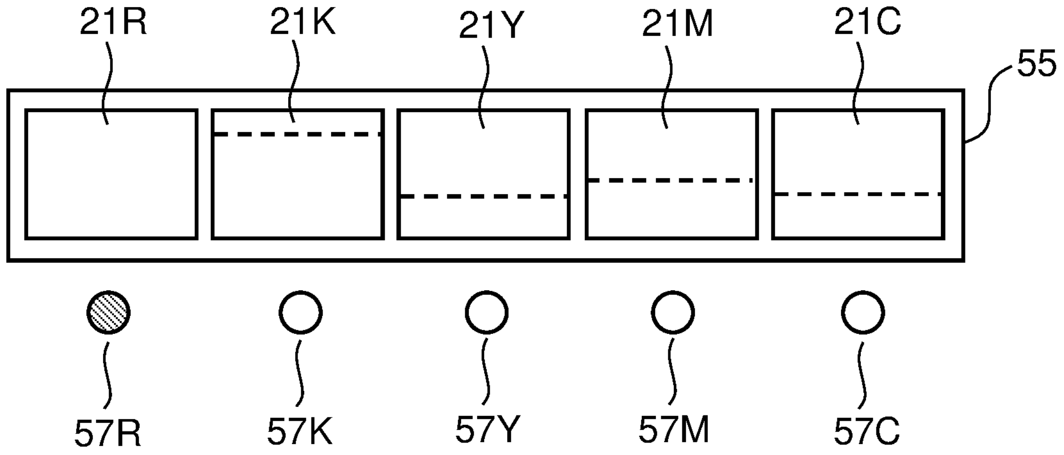
FIG. 11 is a front view of the waste ink collection containers 21C to 21R when fullness of the waste ink collection container 21K has been detected.

FIG. 11 is a front view of the attachment portion 55 for the waste ink collection containers 21C to 21R when it has been detected that the waste ink collection container 21K is full. The attachment portion 55 is provided inside an exterior cover (unillustrated) of the printer main body 1. Close to the attachment portion 55, LED lamps 57C to 57R are disposed corresponding to the waste ink collection containers 21C to 21R.

The operator, after confirming what is indicated on the operation panel 27, opens the exterior cover of the printer main body 1 for access to the waste ink collection containers 21C to 21R attached in the attachment portion 55. At this time, the main control portion 110*a* causes the LED lamp 57R, which corresponds to the waste ink collection container 21R, to blink as shown in FIG. 11. The operator, according to the blinking of the LED lamp 57R, removes the waste ink collection container 21R.

Figure 12:
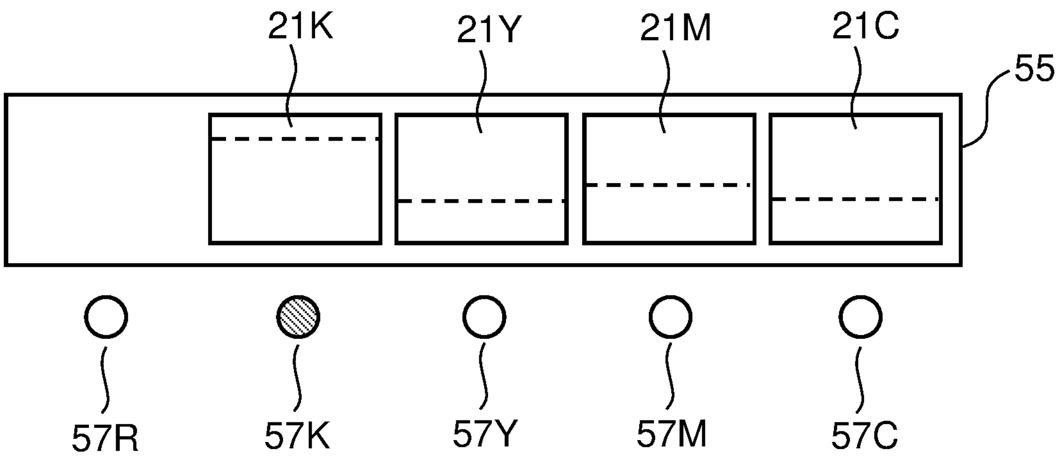
FIG. 12 is a front view of an attachment portions 55 for the waste ink collection containers 21C to 21R, with the waste ink collection container 21R removed.

FIG. 12 is a front view of the attachment portion 55 for attaching the waste ink collection containers 21C to 21R, with the waste ink collection container 21R removed. After the waste ink collection container 21R is removed, the main control portion 110*a* turns off the blinking of the LED lamp 57R, and causes the LED lamp 57K corresponding to the waste ink collection container 21 K that is full to start blinking. The operator, according to the blinking of the LED lamp 57R, removes the waste ink collection container 21K to replace it with the waste ink collection container 21R (step S5).

Figure 13:
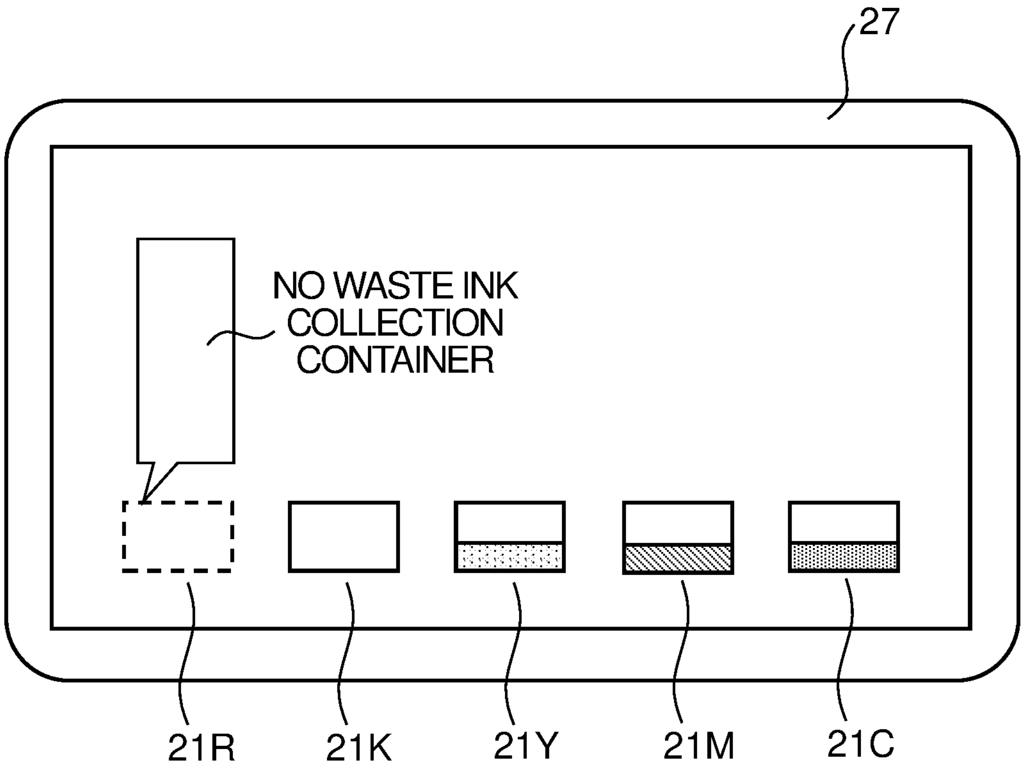
FIG. 13 is a conceptual diagram of the operation panel 27 indicating that the waste ink collection container 21R has been used.

Next, the main control portion 110*a* cancels the indication of the detection of the fullness of the waste ink collection container 21K (step S6). Thereafter, the main control portion 110*a* indicates, on the operation panel 27, that the waste ink collection container 21R that is unused is absent (step S7), and the operation of replacing the waste ink collection containers 21C to 21R is finished. FIG. 13 is a conceptual diagram of the operation panel 27 indicating that the waste ink collection container 21R has been used.

On the other hand, in a case where, in step S3, the waste ink collection container 21R that is unused is absent (No in step S3), the use of the printer 100 is prohibited (step S8) and the process is finished.

According to the example of control shown in FIG. 9, in a case where one of the waste ink collection containers 21C to 21K in use has become full, it is notified to the operator that the waste ink collection container 21R that is unused is available for replacement. Thus, even in a case where waste ink collection containers 21C to 21K for replacement are not available at hand, it is possible to continue using the printer 100, and thus it is possible to suppress occurrence of downtime of the printer 100. Further, the waste ink collection container 21R that is unused is made use of without being left unused, and this contributes to effective use of components.

The procedure of replacing the waste ink collection containers 21C to 21R is indicated by means of the blinking of the LED lamps 57C to 57R, and this makes it possible for the operator to smoothly proceed with the operation of replacing a full one of the waste ink collection containers 21C to 21K, without any risk of following a wrong procedure or erroneously replacing one of the waste ink collection containers 21C to 21K that does not need to be replaced.

Furthermore, after the waste ink collection container 21R that is unused is used as a replacement for the waste ink collection container 21C, 21M, 21Y, or 21K, it is indicated that the waste ink collection container 21R that is unused is absent, and thus the operator can restock a waste ink collection container 21R in preparation for a next case where the waste ink collection container 21, 21M, 21Y, or 21K becomes full or a case where the line head 11R needs to be used.

Note that, even if no waste ink collection container 21R is attached, it will have no effect on operations of the printer 100, and thus it can be freely selected as necessary whether or not to indicate that the waste ink collection container 21R is absent. Further, in a case where a plurality of waste ink collection containers 21R that are unused are attached, the operation panel 27 may indicate that the number of the waste ink collection containers 21R has been reduced as a result of the replacement.

Figure 14:
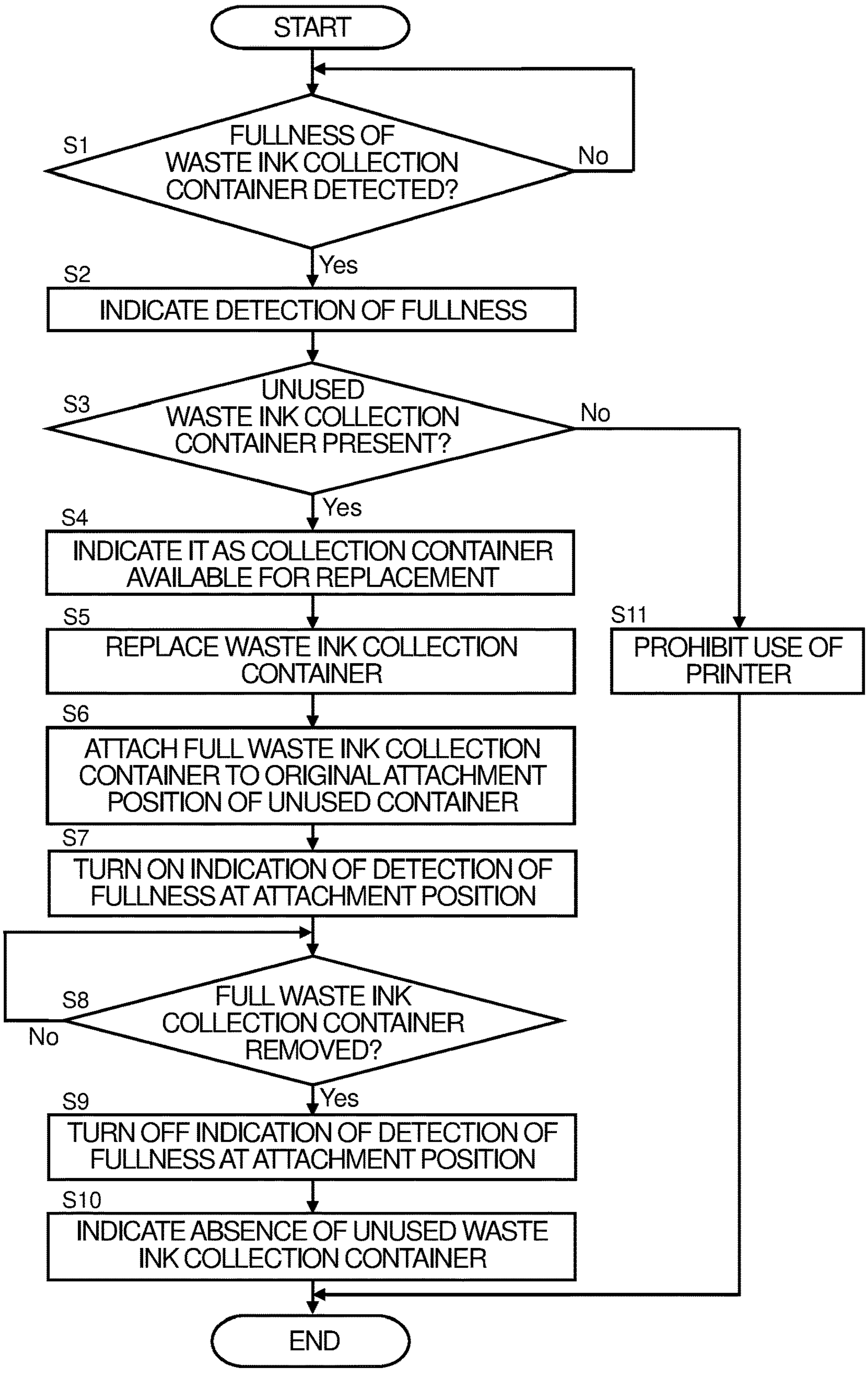
FIG. 14 is a flow chart showing a modified example of the procedure of replacing the waste ink collection containers 21C to 21R executed in the printer 100 according to the present embodiment.

FIG. 14 is a flow chart showing a modified example of the procedure of replacing the waste ink collection containers 21C to 21R executed in the printer 100 according to the present embodiment. In the modified example shown in FIG. 14, the waste ink collection container 21K of which fullness has been detected is removed and replaced with the waste ink collection container 21R that is unused (step S5), and thereafter, the waste ink collection container 21K, which has become full, is attached to the original attachment position of the waste ink collection container 21R (step S6). Then, the indication of the detection of the fullness at the attachment position of the waste ink collection container 21K is brought into an on state (step S7).

Figure 15:
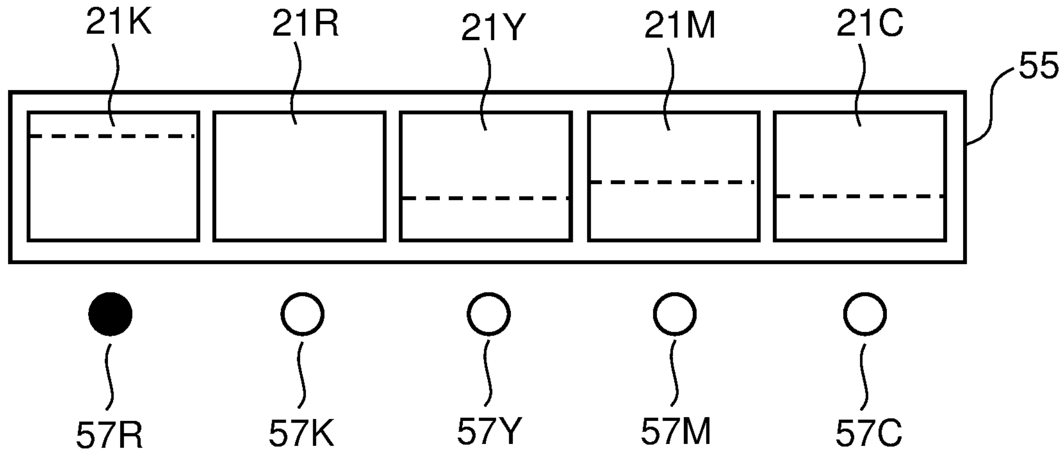
FIG. 15 is a front view of the attachment portion 55 for the waste ink collection containers 21C to 21R, with the full waste ink collection container 21K attached to an original attachment position of the waste ink collection container 21R.

FIG. 15 is a front view of the attachment portion 55 for the waste ink collection containers 21C to 21R, with the waste ink collection container 21K, which has become full, attached to the original attachment position of the waste ink collection container 21R. As shown in FIG. 15, the LED lamp 57R that corresponds to the attachment position of the waste ink collection container 21K (the original attachment position of the waste ink collection container 21R) is turned on.

Next, the main control portion 110*a* determines whether or not the waste ink collection container 21K, which is full. has been removed (step S8). In a case where the waste ink collection container 21K has not been removed (No in step S8), the on state of the indication of the detection of the fullness at the attachment position (the on state of the LED lamp 57R) is continued. In a case where the waste ink collection container 21K has been removed (Yes in step S8), the indication of the detection of the fullness at the attachment position is brought into an off state (the LED lamp 57R is turned off) (step S9). Thereafter, as shown in FIG. 13, it is indicated, on the operation panel 27, that the waste ink collection container 21R that is unused is absent (step S10), and the operation of replacing the waste ink collection containers 21C to 21R is finished. Steps in the procedure other than those described above are the same as in FIG. 9, and thus overlapping descriptions thereof are omitted.

According to the example of control shown in FIG. 14, the waste ink collection container 21K, which has become full, is attached to the original attachment position of the waste ink collection container 21R where it was attached when it was unused. Thereby, in a case where there is no time to dispose of the waste ink collection container 21K or no space for storing it, the original attachment position of the waste ink collection container 21R that is now used as a replacement can be effectively used as a temporary storage space for the waste ink collection container 21K.

Further, by bringing the indication of the detection of the fullness at the attachment position into the on state (turning the LED lamp 57R on) after attaching the full waste ink collection container 21K, it is possible to eliminate the risk of leaving the waste ink collection container 21K without disposing of it. Furthermore, after the waste ink collection container 21K is removed, it is indicated that the waste ink collection container 21R that is unused is absent, and thus the operator can restock a waste ink collection container 21R in preparation for a next case where one of the waste ink collection containers 21C to 21K becomes full or a case where the line head 11R needs to be used.

Note that, even if no waste ink collection container 21R is attached, it will have no effect on operations of the printer 100, and thus it can be freely selected as necessary whether or not to indicate that the waste ink collection container 21R is absent. Here, in a case where a plurality of waste ink collection containers 21R that are unused are attached, the operation panel 27 may indicate that the number of the waste ink collection containers 21R has been reduced as a result of the replacement.

The embodiment described above is in no way meant to limit the present invention, which thus allows for many modifications and variations within the spirit of the present invention. For example, although the above embodiment has dealt with an example where the five line heads 11C to 11R are provided among which the four line heads 11C to 11K are in use, the present invention is applicable as long as at least one line head that is unused is present, and thus the total number of the line heads and the number of the line heads in use can be freely set as necessary.

There is no particular limitation to the number of recording heads 17 in each of the line heads 11C to 11R, and, for example, one recording head 17, two recording heads 17, or four or more recording heads 17 may be disposed in each of the line heads 11C to 11K.

In the above embodiment, both the operation panel 27 and the LED lamps 57C to 57R are used to indicate the states of the recording heads 17 and the waste ink collection containers 21C to 21R, but it is also possible to indicate the states by using either the operation panel 27 or the LED lamps 57C to 57R.

INDUSTRIAL APPLICABILITY

The present invention is usable in inkjet recording apparatuses that perform recording by ejecting ink from ink ejection nozzles provided in recording heads. With use of the present invention, it is possible to provide an inkjet recording apparatus in which an unused recording head and an unused waste ink collection container can be made effective use of.

The invention claimed is:

1. An inkjet recording apparatus, comprising:

a conveyance portion that conveys a sheet;

a plurality of line heads each including a recording head that performs image recording by ejecting ink onto the sheet conveyed by the conveyance portion;

a plurality of waste ink collection containers that each collect and store the ink of a corresponding one of different colors that has been ejected from the recording head but has not been used in the image recording;

a display portion that indicates states of the line heads and the waste ink collection containers; and a control portion that detects the states of the line heads and the waste ink collection containers and controls display performed by the display portion, wherein the plurality of line heads includes an unused line head, the plurality of waste ink collection containers includes an unused waste ink collection container, and in a case where the recording head in one of the line heads in use or one of the waste ink collection containers in use needs to be replaced, the control portion indicates, on the display portion, the recording head in the unused line head or the unused waste ink collection container as a recording head available for replacement or a waste ink collection container available for replacement.

2. The inkjet recording apparatus according to claim 1, wherein the recording head has mounted thereon an external memory that is nonvolatile and that stores color information of the ink and information regarding installation of the ink, and in a case where the recording head in one line head among the line heads in use has been replaced with the recording head that is unused, the control portion writes, on the external memory mounted on the recording head that is unused, the color information of the ink and the information regarding installation of the ink in the one line head.

3. The inkjet recording apparatus according to claim 1, wherein in a case where the unused waste ink collection container exists and fullness of one waste ink collection container among the waste ink collection containers in use has been detected, the control portion uses the display portion to indicate a procedure of replacing the waste ink collection containers.

4. The inkjet recording apparatus according to claim 1, wherein one waste ink collection container among the waste ink collection containers that has become full is temporarily placeable in a position from which the unused waste ink collection container has been removed.

5. The inkjet recording apparatus according to claim 4, wherein in a case where the one waste ink collection container that has become full is temporarily placed in the position from which the unused waste ink collection container has been removed, the control portion uses the display portion to indicate that the waste ink collection container that is temporarily placed is full.

6. The inkjet recording apparatus according to claim 5, wherein in a case where the waste ink collection container that is temporarily placed is removed, the control portion deletes the indication that the waste ink collection container that is temporarily placed is full.

7. The inkjet recording apparatus according to claim 1, wherein in a case where the recording head that is unused or the unused waste ink collection container is used, the control portion uses the display portion to indicate that no recording head or no waste ink collection container is available for replacement, or that a number of recording heads available for replacement or a number of waste ink collection containers available for replacement has been reduced.

* * * * *